(12) United States Patent
Stewart et al.

(10) Patent No.: US 10,274,627 B2
(45) Date of Patent: Apr. 30, 2019

(54) OCEAN BOTTOM SEISMIC SYSTEMS

(71) Applicant: ION Geophysical Corporation, Houston, TX (US)

(72) Inventors: Peter Graham Stewart, Houston, TX (US); Cornelis A. M. Faber, Voorhout (NL)

(73) Assignee: ION Geophysical Corporation, Houston, TX (US)

( * ) Notice: Subject to any disclaimer, the term of this patent is extended or adjusted under 35 U.S.C. 154(b) by 46 days.

(21) Appl. No.: 15/339,233

(22) Filed: Oct. 31, 2016

(65) Prior Publication Data
US 2017/0123091 A1 May 4, 2017

Related U.S. Application Data

(60) Provisional application No. 62/249,095, filed on Oct. 30, 2015.

(51) Int. Cl.
*G01V 1/38* (2006.01)
*G01P 15/08* (2006.01)
(Continued)

(52) U.S. Cl.
CPC ........ *G01V 1/3852* (2013.01); *G01P 15/0802* (2013.01); *G01P 15/097* (2013.01);
(Continued)

(58) Field of Classification Search
CPC ............... G01V 1/3852; G01V 1/3808; G01V 2210/1427; G01V 1/38; G01V 1/104;
(Continued)

(56) References Cited

U.S. PATENT DOCUMENTS 3,307,054 A  2/1967  Shoor
3,706,217 A  12/1972  Slater et al.
(Continued)

FOREIGN PATENT DOCUMENTS

CZ  301217 B6  12/2009
EP  0560558 A2  9/1993
(Continued)

OTHER PUBLICATIONS

Chapsky et al., "Single-mass 6-DOF isotropic accelerometer with segmented PSD sensors," Sensors and Actuators A 135 (2007) 558-569. (Year: 2007).*
(Continued)

*Primary Examiner* — Daniel L Murphy
(74) *Attorney, Agent, or Firm* — Dorsey & Whitney LLP (57) ABSTRACT

A seismic sensor system includes a seismic sensor suspended in an acoustic medium, which is disposed between first and second sensor housings. The acoustic medium can be selected to preferentially transmit pressure wave energy, based on the acoustic impedance of the surrounding water column or other seismic medium. The acoustic medium can also be selected to preferentially dissipate or otherwise reduce the transmitted shear wave energy. The second housing can similarly be configured to dissipate shear wave energy, while transmitting pressure wave energy in the form of acoustic waves that propagate through the acoustic medium to the seismic sensor.

28 Claims, 5 Drawing Sheets

(51) Int. Cl.
  *G01P 15/097* (2006.01)
  *G01V 1/16* (2006.01)
  *G01V 13/00* (2006.01)

(52) U.S. Cl.
  CPC .............. *G01V 1/164* (2013.01); *G01V 1/38* (2013.01); *G01V 1/3808* (2013.01); *G01V 13/00* (2013.01); *G01P 2015/084* (2013.01); *G01V 2210/1427* (2013.01)

(58) Field of Classification Search
  CPC ... G01V 13/00; G01P 15/0802; G01P 15/097; G01P 2015/084
  USPC .......................................................... 367/15
  See application file for complete search history.

(56) References Cited

U.S. PATENT DOCUMENTS

| | | |
|---|---|---|
| 4,348,142 A | 9/1982 | Figour |
| 4,398,417 A | 8/1983 | Shutt |
| 4,500,979 A | 2/1985 | Scott |
| 4,510,802 A | 4/1985 | Peters |
| 4,601,206 A | 7/1986 | Watson |
| 4,711,125 A | 12/1987 | Morrison |
| 4,736,640 A | 4/1988 | Hooks |
| 4,870,290 A | 9/1989 | Deck |
| 4,893,930 A | 1/1990 | Garrett et al. |
| 4,941,243 A | 7/1990 | Cleveland |
| 5,007,292 A | 4/1991 | Crowe et al. |
| 5,046,057 A | 9/1991 | Berni |
| 5,224,380 A | 7/1993 | Paik |
| 5,383,363 A | 1/1995 | Kulmaczewski |
| 5,408,879 A | 4/1995 | Vreeburg et al. |
| 5,512,794 A | 4/1996 | Kuebler et al. |
| 5,572,081 A | 11/1996 | Starck |
| 5,589,828 A | 12/1996 | Armstrong |
| 5,673,330 A | 9/1997 | Chang |
| 5,748,567 A | 5/1998 | Mori et al. |
| 5,767,840 A | 6/1998 | Selker |
| 5,831,164 A | 11/1998 | Reddi et al. |
| 5,866,817 A | 2/1999 | Mori et al. |
| 5,969,268 A | 10/1999 | Sommerfeld et al. |
| 5,996,412 A | 12/1999 | Hansen |
| 5,996,416 A | 12/1999 | Eguchi |
| 5,999,084 A | 12/1999 | Armstrong |
| 6,094,991 A | 8/2000 | Stewart et al. |
| 6,102,802 A | 8/2000 | Armstrong |
| 6,122,965 A | 9/2000 | Seidel et al. |
| 6,135,886 A | 10/2000 | Armstrong |
| 6,208,271 B1 | 3/2001 | Armstrong |
| 6,222,525 B1 | 4/2001 | Armstrong |
| 6,285,356 B1 | 9/2001 | Armstrong |
| 6,310,606 B1 | 10/2001 | Armstrong |
| 6,343,991 B1 | 2/2002 | Armstrong |
| 6,344,791 B1 | 2/2002 | Armstrong |
| 6,347,997 B1 | 2/2002 | Armstrong |
| 6,349,604 B1 | 2/2002 | Byun et al. |
| 6,351,205 B1 | 2/2002 | Armstrong |
| 6,397,677 B1 | 6/2002 | Kinsley et al. |
| 6,400,303 B2 | 6/2002 | Armstrong |
| 6,404,584 B2 | 6/2002 | Armstrong |
| 6,415,707 B1 | 7/2002 | Armstrong |
| 6,453,745 B1 | 9/2002 | Jalkanen |
| 6,456,778 B2 | 9/2002 | Armstrong |
| 6,469,691 B1 | 10/2002 | Armstrong |
| 6,470,078 B1 | 10/2002 | Armstrong |
| 6,484,578 B2 | 11/2002 | Woodruff et al. |
| 6,496,449 B1 | 12/2002 | Armstrong |
| 6,504,527 B1 | 1/2003 | Armstrong |
| 6,512,980 B1 | 1/2003 | Barr et al. |
| 6,518,953 B1 | 2/2003 | Armstrong |
| 6,529,185 B1 | 3/2003 | Armstrong |
| 6,532,000 B2 | 3/2003 | Armstrong |
| 6,538,638 B1 | 3/2003 | Armstrong |
| 6,539,308 B2 | 3/2003 | Monk et al. |
| 6,559,831 B1 | 5/2003 | Armstrong |
| 6,563,415 B2 | 5/2003 | Armstrong |
| 6,576,103 B2 | 6/2003 | Abramovich et al. |
| 6,662,658 B2 | 12/2003 | Foote |
| 6,662,659 B2 | 12/2003 | Saitoh |
| 6,679,118 B1 | 1/2004 | Esashi et al. |
| 6,693,625 B2 | 2/2004 | Armstrong |
| 6,705,167 B2 | 3/2004 | Kvisteroey et al. |
| 6,810,737 B2 | 11/2004 | Kawai |
| 6,826,960 B2 | 12/2004 | Schaad et al. |
| 6,845,665 B2 | 1/2005 | Geen |
| 6,848,304 B2 | 2/2005 | Geen |
| 6,868,356 B2 | 3/2005 | Nai et al. |
| 6,891,621 B2 | 5/2005 | Berg et al. |
| 6,906,700 B1 | 6/2005 | Armstrong |
| 7,084,759 B2 | 8/2006 | Cox et al. |
| 7,104,128 B2 | 9/2006 | Inglese et al. |
| 7,167,413 B1 | 1/2007 | Rouquette |
| 7,178,401 B2 | 2/2007 | Byrd |
| 7,222,534 B2 | 5/2007 | Maas et al. |
| 7,239,577 B2 | 7/2007 | Tenghamn et al. |
| 7,258,011 B2 | 8/2007 | Nasiri et al. |
| 7,345,670 B2 | 3/2008 | Armstrong |
| 7,359,283 B2 | 4/2008 | Vaage et al. |
| 7,360,456 B2 | 4/2008 | Morimoto |
| 7,367,232 B2 | 5/2008 | Vaganov et al. |
| 7,474,591 B2 | 1/2009 | Menard et al. |
| 7,500,395 B2 | 3/2009 | Mori |
| 7,500,406 B2 | 3/2009 | Morimoto |
| 7,503,215 B2 | 3/2009 | Berg et al. |
| 7,594,438 B2 | 9/2009 | Ackerley et al. |
| 7,617,727 B2 | 11/2009 | Watson |
| 7,644,602 B2 | 1/2010 | Umeda |
| 7,656,746 B2 | 2/2010 | De et al. |
| 7,673,515 B2 | 3/2010 | Gan et al. |
| 7,680,620 B2 | 3/2010 | Umeda |
| 7,926,614 B2 | 4/2011 | Tenghamn et al. |
| 8,117,912 B2 | 2/2012 | Kawakubo et al. |
| 8,176,779 B2 | 5/2012 | Blomqvist |
| 8,199,611 B2 | 6/2012 | Goujon |
| 8,205,498 B2 | 6/2012 | Hsu et al. |
| 8,256,290 B2 | 9/2012 | Mao |
| 8,266,959 B2 | 9/2012 | Lin |
| 8,342,025 B2 | 1/2013 | Coronato et al. |
| 8,351,298 B2 | 1/2013 | De Kok et al. |
| 8,453,506 B2 | 6/2013 | Lu |
| 8,674,932 B2 | 3/2014 | Armstrong |
| 9,003,885 B2 | 4/2015 | Pan et al. |
| 9,081,426 B2 | 7/2015 | Armstrong |
| 9,207,339 B2 | 12/2015 | Beal et al. |
| 9,213,046 B2 | 12/2015 | Wang |
| 9,217,808 B2 | 12/2015 | Yoneshima et al. |
| 9,274,015 B2 | 3/2016 | Schlipf et al. |
| 9,310,391 B2 | 4/2016 | Seshia et al. |
| 9,488,671 B2 | 11/2016 | Levy |
| 9,770,826 B2 | 9/2017 | Kamiya et al. |
| 9,816,886 B2 | 11/2017 | Inazumi |
| 9,829,594 B2 * | 11/2017 | Ray ...................... G01V 1/166 |
| 9,835,749 B2 | 12/2017 | De Kok et al. |
| 9,841,434 B2 | 12/2017 | Sonderegger et al. |
| 9,846,100 B2 | 12/2017 | Klöpper |
| 2001/0004846 A1 | 6/2001 | Kawai |
| 2002/0180978 A1 | 12/2002 | Berg et al. |
| 2003/0079358 A1 | 5/2003 | Nai et al. |
| 2004/0042341 A1 | 3/2004 | Tenghamn et al. |
| 2006/0021436 A1 | 2/2006 | Kapser et al. |
| 2006/0133202 A1 | 6/2006 | Tenghamn |
| 2006/0219009 A1 | 10/2006 | Maas et al. |
| 2006/0245300 A1 | 11/2006 | De Kok et al. |
| 2007/0073502 A1 | 3/2007 | Umeda |
| 2007/0295087 A1 | 12/2007 | Umeda |
| 2007/0297827 A1 | 12/2007 | Blaine et al. |
| 2009/0065289 A1 | 3/2009 | Tenghamm |
| 2010/0237870 A1 | 9/2010 | Dodds |
| 2011/0182140 A1 * | 7/2011 | Lambert .................. G01V 1/36 367/24 |
| 2012/0057430 A1 | 3/2012 | Rouquette et al. |
| 2013/0088939 A1 * | 4/2013 | Edme ..................... G01V 1/284 367/43 |

(56) References Cited

U.S. PATENT DOCUMENTS

| | | | |
|---|---|---|---|
| 2014/0241122 A1* | 8/2014 | Ponceau | G01V 1/38 367/18 |
| 2014/0328138 A1 | 11/2014 | Lambert et al. | |
| 2014/0352431 A1 | 12/2014 | Leclerc | |
| 2016/0312603 A1 | 10/2016 | Gottlieb et al. | |
| 2017/0123088 A1 | 5/2017 | Faber | |

FOREIGN PATENT DOCUMENTS

| | | |
|---|---|---|
| EP | 1292832 A2 | 3/2003 |
| EP | 2202540 A2 | 6/2010 |
| GB | 2411722 A | 9/2005 |
| JP | H10256144 A | 9/1998 |
| JP | 2001-27579 A | 1/2001 |
| JP | WO2005095998 A1 | 10/2005 |
| WO | 96/06328 A1 | 2/1996 |
| WO | 2011091252 A2 | 7/2011 |
| WO | 2016170848 A1 | 10/2016 |
| WO | 2016206094 A1 | 12/2016 |
| WO | 2017182994 A1 | 10/2017 |

OTHER PUBLICATIONS

International Search Report and Written Opinion dated Feb. 7, 2017 in connection with International Patent Application No. PCT/US2016/059723, 13 pages.

International Search Report and Written Opinion dated Feb. 7, 2017 in connection with International Patent Application No. PCT/US2016/059725, 13 pages.

Wang, Yi et al., "What comes up must have gone down: the principle and application of Up-Down Deconvolution for Multiple Attenuation of Ocean Bottom Data," CSEG Recorder, Dec. 2009, pp. 16-20.

Jiang, Qi et al., "Simulation and experimental study of a three-axis fiber Bragg grating accelerometer based on the pull-push mechanism," Meas. Sci. Technol. 24 (2013), 9 pages.

Reichenbach, Ralf et al., "Micromechanical triaxial acceleration sensor for automotive applications," IEEE 2003, pp. 77-80.

"High Resolution Rotation Seismometer, Model R-1," obtained Jul. 5, 2016 from <http://www.eentec.com/R-1_data_new.htm>, 3 pages.

"Force Balanced Accelerometer Model EA-120," obtained Jul. 5, 2016 from <http://www.eentec.com/EA-120_data_new.htm>, 3 pages.

Nigbor, Robert L., "Six-Degree-of-Freedom Ground-Motion Measurement," Bulletin of Seismological Society of America, vol. 84, No. 5, pp. 1665-1669, Oct. 1994, 5 pages.

Aldcroft, T.L. et al., "Six-degree-of-freedom vibration isolation systems with application to resonant-mass gravitational radiation detectors," Rev. Sci. Instrum. 63 (8), Aug. 1992, pp. 3815-3827, 13 pages.

Geng, Z. Jason et al., "Six Degree-of-Freedom Active Vibration Control Using the Stewart Platforms," IEEE Transactions on Control Systems Technology, vol. 2, No. 1, Mar. 1994, pp. 45-53, 9 pages.

Chen, Jeng-Heng et al., "Gyroscope Free Strapdown Inertial Measurement Unit by Six Linear Accelerometers," Journal of Guidance, Control, and Dynamics, vol. 17, No. 2, Mar.-Apr. 1994, pp. 286-290, 5 pages.

Amarasinghe, Ranjith et al., "A Silicon Micromachined Six-Degree of Freedom Piezoresistive Accelerometer," IEEE, 2004, pp. 852-855, 5 pages.

Amarasinghe, Ranjith et al., "Design & Fabrication of Piezoresistive Six Degree of Freedom Accelerometer for Biomechanical Applications," 2004 IEEE, International Conference on MEMS, NANO and Smart Systems, Aug. 2004, Banff, Alberta, Canada, 10 pages.

Amarasinghe, Ranjith et al., "Design and fabrication of a miniaturized six-degree-of-freedom piezoresistive accelerometer," J. Micromech. Microeng. 15 (2005), pp. 1745-1753, 9 pages.

Elboth, Thomas, "Noise in Marine Seismic Data", Series of Dissertations submitted to the Faculty of Mathematics, and Natural Sciences, University of Oslo, Norway, Ch. 9 removed, 141 pages.

* cited by examiner

OCEAN BOTTOM SEISMIC SYSTEMS

CROSS-REFERENCE TO RELATED APPLICATIONS

This application claims priority to U.S. Provisional Application No. 62/249,095, filed Oct. 30, 2015, entitled OCEAN BOTTOM SYSTEM, which is incorporated by reference herein, in the entirety and for all purposes. This application is related to copending U.S. application Ser. No. 15/399,276 filed on Oct. 31, 2016, and entitled MULTI-AXIS, SINGLE MASS ACCELEROMETER, which is incorporated by reference herein, in the entirety and for all purposes.

BACKGROUND

This application relates generally to geophysical exploration, and more specifically to seismic data acquisition and sensor technologies. In particular, the application relates to sensor systems for marine seismic surveys, including, but not limited to, ocean bottom cables and autonomous seismic node applications.

Petrochemical products are ubiquitous in the modern economy, and can be found in everything from oil and gasoline to medical devices, children's toys, and a wide range of everyday household items. To meet the continuing demand for these products, oil and gas reserves must be accurately located and surveyed, so that these important resources can be effectively managed. As a result, there is an ongoing need for new seismic sensor systems and more advanced exploration technologies.

Scientists and engineers typically utilize seismic wave-based exploration to locate new oil and gas reservoirs, and to survey and manage existing reserves over time. Seismic surveys are performed by deploying an array of seismic sensors or receivers over the region of interest, and monitoring the response to controlled emission of seismic energy via a seismic source such as a vibrator, air gun array, or explosive detonation. The response depends upon the seismic energy reflected from mineral reservoirs and other subsurface formations, allowing an image of the corresponding structures to be generated.

Conventional marine seismic surveys typically proceed by towing an array of seismic sensors or receivers behind a survey vessel, with the receivers distributed along one or more streamer cables. A set of air guns or other seismic sources is used to generate the seismic energy, which propagates down through the water column to penetrate the ocean floor (or other bottom surface). A portion of the seismic energy is reflected from subsurface structures, and returns through the water column to be detected in the streamer array. Alternatively, seismic receivers can also be disposed along an ocean-bottom cable, or provided in the form of individual, autonomous seismic nodes distributed on the seabed.

Seismic receivers include both pressure sensors and particle motion detectors, which can be provided as individual sensor components or combined together with both sensor types provided in close proximity within a receiver module or seismic node. For example, a set of pressure sensors can be configured in a hydrophone array, and adapted to record scalar pressure measurements of the seismic wavefield propagating through the water column or other seismic medium. Particle motion sensors include accelerometers and geophones, which can provide single-axis or three-dimensional vector velocity measurements that characterize motion of the medium in response to propagating seismic waves.

Geophysical data pertaining to subsurface structures is acquired by observing the reflected seismic energy with an array of such receiver components. The resulting seismic signals can be used to generate an image characterizing the subsurface composition and geology in and around the survey area. The overall image quality depends on noise and signal sensitivity, creating a demand for more advanced sensor and receiver technologies.

SUMMARY

This application is directed to a seismic sensor system with one or more of the sensors enclosed in a region or housing with an acoustic impedance similar to that of the surrounding water column or other medium. Acoustic signals travelling through the medium are transmitted to the sensors, with minimal or reduced reflection.

For example, a seismic sensor system may include a sensor housing in communication with a seismic medium, and an acoustic medium disposed within the sensor housing. The acoustic medium can be selected based on the acoustic impedance of the seismic medium, in order to transmit pressure wave energy. A seismic sensor such as an accelerometer or geophone can be suspended within the acoustic medium, with the sensor housing configured to dissipate incident shear wave energy. Thus, the pressure wave energy can be preferentially transmitted to the seismic sensor in the form of acoustic waves propagating through the acoustic medium, while the shear wave energy can preferentially dissipated or absorbed.

The exterior of the sensor housing can be formed of or comprise a perforated, rigid housing covered with a flexible, acoustically transparent skin. The interior of the housing can be filled with a fluid, gel or other acoustic medium, where the skin and fluid may both have acoustic impedances substantially equal to that of the surrounding water column (or other seismic medium). An accelerometer or geophone can then be suspended in the acoustic medium, and at least partially or substantially isolated from motion of the exterior housing. This shields the accelerometer or geophone from shear noise incident from the seismic medium, which would otherwise be transferred to the sensor via mechanical coupling to the exterior housing.

This application also encompasses a multi-axis particle motion sensor or accelerometer suitable for use in such a system. For example, a plurality of sensor components can be coupled to a single mass, with sensitivity to linear motion and acceleration along three independent or orthogonal directions, and sensitivity to rotational motion and acceleration about the three independent or orthogonal axes. The individual sensor components can be configured to sense linear and rotational motions based on dynamic coupling to the mass, including, but not limited to, force-sensitive linear coupling and torque-sensitive rotational coupling. The rotational couplings may be substantially sensitive to shear waves, allowing for suppression or enhancement of shear effects in a combined sensor signal, as described herein.

This summary is provided to introduce a selection of concepts in a simplified form that are further described below in the detailed description. This summary is not intended to identify key or essential features of the claimed subject matter, nor is it intended to be used to limit the scope of the claimed subject matter. A more extensive presentation of features, details, utilities, and advantages of the claimed invention is provided in the following written description, including various representative embodiments of the invention, and as illustrated in the accompanying drawings.

DETAILED DESCRIPTION

In this disclosure, reference is made to examples and embodiments of the invention. However, it should be understood that the invention is not limited to these or any other specifically described embodiments. Any combination of the disclosed features and elements, whether related to different embodiments or not, is contemplated to implement and practice the invention. Furthermore, in various examples and embodiments the invention provides numerous advantages over the prior art. Although certain embodiments may achieve these and other advantages over different potential solutions, and over the prior art, whether or not a particular advantage is achieved by a given embodiment is not limiting of the invention as claimed. Thus, the following aspects, features, embodiments and advantages are merely illustrative, and should not be considered elements or limitations of the claims, except where explicitly specified in the claim language. Likewise, references to "the invention" shall not be construed as a generalization of any inventive subject matter disclosed herein, and shall not be considered to represent an element or limitation of any claim except where expressly recited therein.

Some embodiments of the invention may be implemented as a program product or executable method for use with a computerized system. Suitable programs may define functions of the various embodiments and methods described herein, and can be provided via a variety of computer-readable media. Illustrative computer-readable media include, but are not limited to: (i) information permanently stored on non-writable storage media (e.g., read-only memory within a computer such as ROM devices or CD-ROM disks); (ii) alterable information stored on writable storage media (e.g., random access or RAM devices, flash memory and other solid-state devices, and magnetic disks or hard drives); and (iii) information conveyed to a computer by a communications medium, such as through a wireless network, including applications, program code and other information downloaded from the Internet or other network. Suitable non-transitory computer-readable media embodiments include computer-readable instructions that are executable on a computer processor to direct the various functions and method steps of the present invention, and also represent embodiments of the present invention.

In general, routines executed to implement the methods and embodiments of the invention may be part of an operating system or provided as a specific application, component, program, module, object, or sequence of instructions. The computer program application of the present invention typically comprise multitude of instructions that can be translated by a computer into a machine-readable format, for example in the form of executable instructions. Programs may also encompass variables, parameters and data structures that either reside locally to the program data, or are found in other memory or storage devices. In addition, the various programs and computer-executable methods described herein may be identified based upon the application for which they are implemented, according to any specific embodiment of the invention. It should also be appreciated that any particular nomenclature that follows is used merely for convenience, and the invention should not be construed as being limited to any specific application identified with or implied by such nomenclature.

Figure 1:
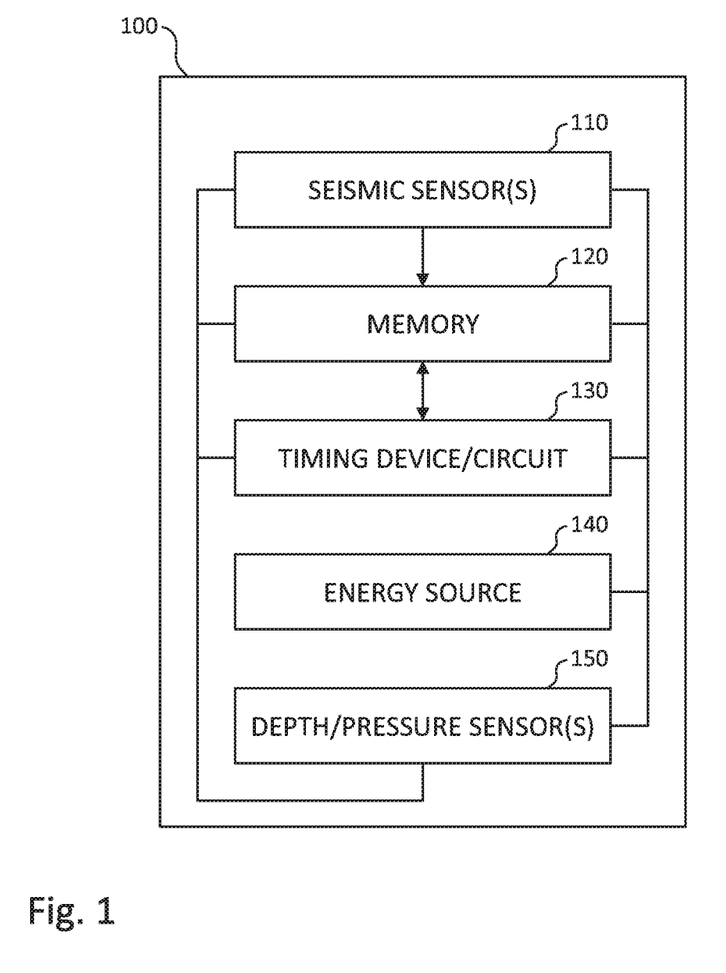
FIG. 1 is a block diagram illustrating a representative modular seismic sensor station or node.

FIG. 1 is a block diagram illustrating exemplary components of an ocean bottom seismic sensor station 100 according to an embodiment of the invention. As shown in FIG. 1, the sensor station 100 may include one or more seismic sensors 110 and a memory device 120. The seismic sensors 110 may include any number and combination of sensors such as hydrophones, geophones, accelerometers, or the like.

In one embodiment, the sensors 110 may include a three component (3C) sensor configured to measure the three spatial components of seismic waves. In some embodiments, the sensors may measure linear motion, rotation, or both. The seismic sensors 110 may also include digital sensors, for example, a micro electro mechanical system (MEMS) accelerometer. Examples of these and other suitable devices are disclosed in U.S. Pat. No. 6,883,638 by Peter Maxwell et al., entitled ACCELEROMETER TRANSDUCER USED FOR SEISMIC PROSPECTING and filed with priority to Mar. 16, 2009, which is incorporated by reference herein, in its entirety. The use of digital sensors may have advantages including the ability to perform automated calibration, reduced manufacturing variance between sensors, improved frequency response, uniform performance in any orientation, and small and compact packaging, among others.

In one embodiment, the seismic sensors 110 may include piezo-electric sensors. Examples of suitable piezo-electric sensors are disclosed in U.S. Pat. No. 9,294,011 and U.S. patent application Ser. No. 13/984,266 (U.S. Publication No. 2013/0319118) by Ken Kan Deng, both entitled METHOD AND APPARATUS FOR SENSING UNDERWATER SIGNALS and filed with priority to Feb. 7, 2012, each of which is hereby incorporated by reference herein, in the entirety.

The memory 120 is preferably a random access memory, storage medium or other memory component sufficiently large to hold a desired amount of seismic data. While memory 120 is shown as a single entity, it should be understood that memory 120 may in fact comprise a plurality of memory components or modules, and memory 120 may exist at multiple operation levels, from high speed registers and caches to lower speed but larger DRAM chips.

In one embodiment, the sensor station 100 may also include a timing device or clock circuit 130 and/or a power supply or energy source 140. In one embodiment, the timing device 130 may include a resonator, crystal, or oscillator configured to generate a timing signal for recording seismic data. In one embodiment, the timing device 130 may be configured to independently generate a clock signal for the seismic sensor station. In alternative embodiments, the timing device may be configured to receive an external clock signal from a master clock, and to generate a clock signal for the seismic sensor station 100 based on the received external clock signal.

The energy source 140 may be configured to provide power to the sensors 110, memory 120, and other electronic circuits in the station 100. In one embodiment the energy source 140 may include a battery sufficiently large to provide power to the station 100 for the duration of a seismic survey. In an alternative embodiment, power may be externally provided to the sensor station 100 via a cable or inductive coupling energy source, or otherwise as described herein.

In one embodiment of the invention, the seismic sensor station 100 may include one or more depth and/or pressure sensors 150. The depth or pressure sensors 150 may be configured to determine a depth of the seismic sensor station during deployment and/or retrieval. In one embodiment, a threshold depth may be defined for switching the seismic sensor station on or off. For example, during deployment, the sensors, memory and other circuits of the seismic sensor station 100 may not be powered until a threshold depth (as measured by the depth/pressure sensors 150) is reached. Similarly, during retrieval, when a threshold depth is reached, one or more circuits of the seismic sensor station may be powered down. By selectively powering one or more circuits of the seismic sensor station 100, embodiments of the invention may conserve power and extend the life of the seismic sensors station during operations to record seismic data.

Figure 2:
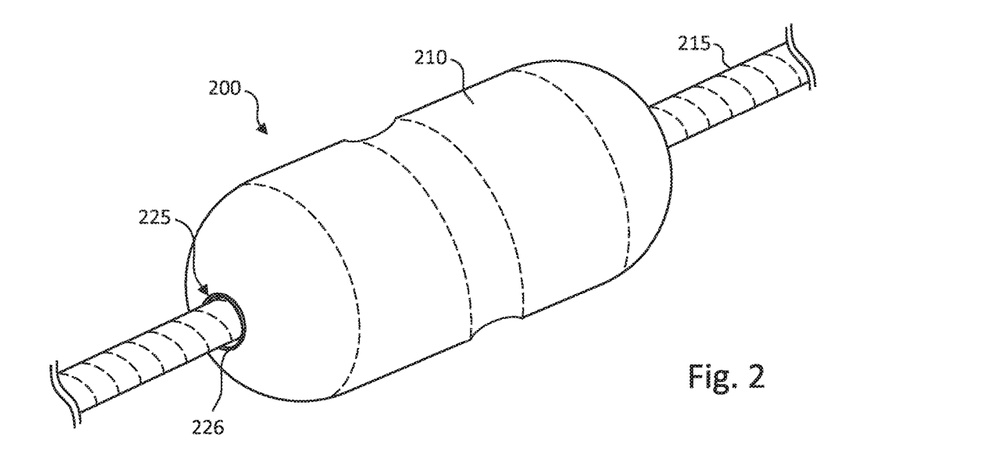
FIG. 2 is an isometric view of a modular seismic sensor station, in an embodiment with an integrated housing.

FIG. 2 is an isometric view of a sensor station 200, for example with one or more features according to sensor station 100 of FIG. 1, and in a modular embodiment with an integrated housing 210. In this embodiment, the seismic sensor station 200 may be formed with a single integrated housing 210, as shown in FIG. 2. All electronic components such as sensors, batteries, memory, and other circuitry may be contained within the housing 210.

In one embodiment of the invention, the seismic sensor station may be configured to be deployed via a rope or cable 215. Accordingly, the housing 210 may include a passage 225 defined through housing 210 for receiving the rope or cable 215. In some embodiments, a connection mechanism 226, for example, clamping members, loops, or the like, may be provided to facilitate connection to the rope or cable 215. In some embodiments, the sensor station 200 may be deployed without a rope, e.g., via a remotely operated vehicle or simply by dropping the station into the water. In embodiments where a rope is not used, the passage 225 may be omitted, or a plug or similar component may be utilized to cover passage 210 at one or both ends.

Figure 3:
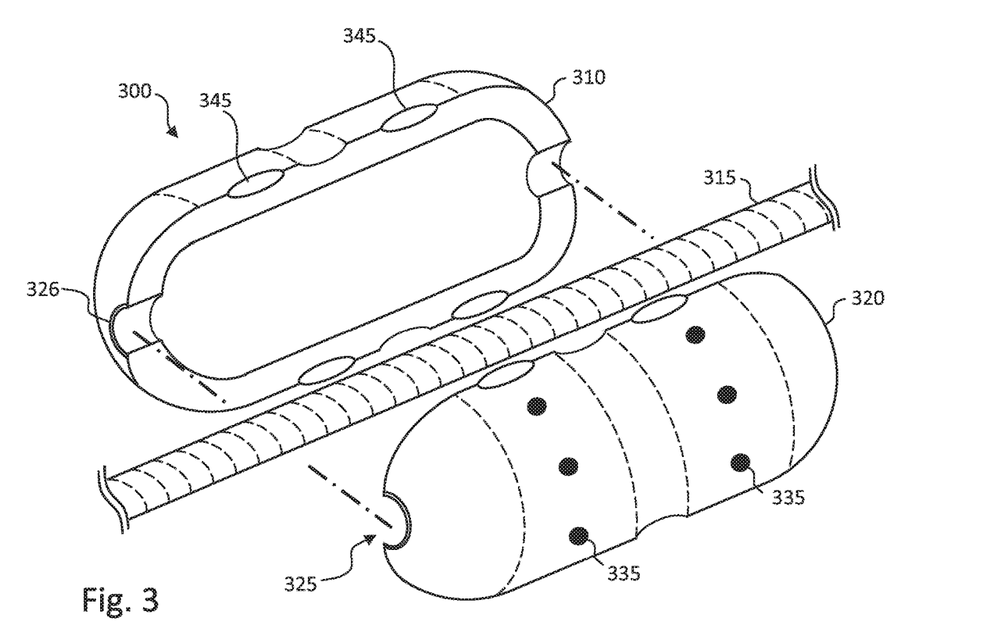
FIG. 3 is an isometric, disassembled view of a modular seismic sensor station, in an embodiment with modular housing components.

FIG. 3 is an isometric disassembled view of a sensor station 300, for example with one or more features according to sensor stations 100 or 200 of FIGS. 1 and 2, and in an embodiment with modular housing components 310 and 320. FIG. 3 illustrates an embodiment where two or more housing portions or components 310 and 320 are configured to attach to one another to form a completed modular sensor station 300. For example, as shown in FIG. 3, a first module housing 310 of the modular station may include a sensor package (or sensor module) comprising one or more seismic sensors. A second module housing 320 may include a memory and/or battery package comprising an energy source and memory components (hereinafter referred to as a memory package or memory module).

In particular examples and embodiments, the sensor module 310 may be configured to couple with the memory module 320 along or about a rope or cable 315, thereby forming a modular station that is affixed to the rope 315. While the modular sensor station 300 is shown as comprising two modular housing components 310, 320, in alternative embodiments, the modular station 300 may include any number of a plurality of such components. For example, a compound memory module 320 may be formed by coupling a distinct memory package to a distinct battery package, e.g., each with separate housing components. In general, embodiments of the invention are directed to a modular station 300 that is formed by coupling two or more distinct housings 310, 320, etc. to one another to form a complete station, where the coupling may also cause the complete station to become attached to a deployment rope 315. The particular components provided in each housing section or module 310, 320 may also vary according to application, and individual modular components may include one or more seismic sensors, memory components, timing devices or timing circuits, power supplies or energy sources, and depth or pressure sensors, as described herein.

In one embodiment, the modules 310 and 320, when connected, may be asymmetrical to one another about the rope 315. For example, the memory module 320 may be significantly larger than the sensor module 310, and occupy a substantially greater fraction of the radial range about rope 315 within the generally oblong or cylindrical arrangement of modular sensor station 300. Alternatively the modules 310 and 320 may be substantially symmetrical, each occupying about half (or 180 degrees) of the radial range about rope 315, as shown in FIG. 3.

A larger housing may be utilized for the memory module 320 to allow greater space for including a sufficiently large battery and memory device. In one embodiment of the invention, one or more of the modular housing components 210, 310 and 320 and/or the assembled sensor station 200 or 300 may be hydrodynamically shaped to facilitate travel through the water column during deployment and/or retrieval operations. In one embodiment, the casings for the components 210, 310 and 320 may also include coupling features 335, e.g., studs, cleats, etc. to facilitate better attachment to and coupling with the seabed, thereby improving sensor sensitivity and the quality of seismic data that is collected.

Coupling the sensor module 310 to the memory module 320 may involve clamping the sensor module 310 and the memory module 320 onto the rope 315 at a predetermined location, e.g., utilizing clamping members or other mechanical attachments 326 to attach modules 310, 320 of sensor station 300 about rope 315 at the openings of aperture 325 (e.g., at the opposite ends of an axial aperture 325 extending through the elongated hydrodynamic body of the sensor station or node 300, as shown in FIG. 3). The clamping of the sensor module 310 and the memory module 320 may also involve engaging one or more physical features on or inside the housings of the modules 310 and 320 to each other and/or to the rope, for example complementary coupling features 345.

Furthermore, clamping the components 310 and 320 may also electrically connect the respective internal components to each other via internal electronic interfaces in each module. In an alternative embodiment, the components 310 and 320 may first be coupled together, and thereafter the assembled seismic sensor station or node 300 may be attached to the rope or cable 315, e.g., via a passage 325 that is defined by the connected housings 310 and 320.

Figure 4:
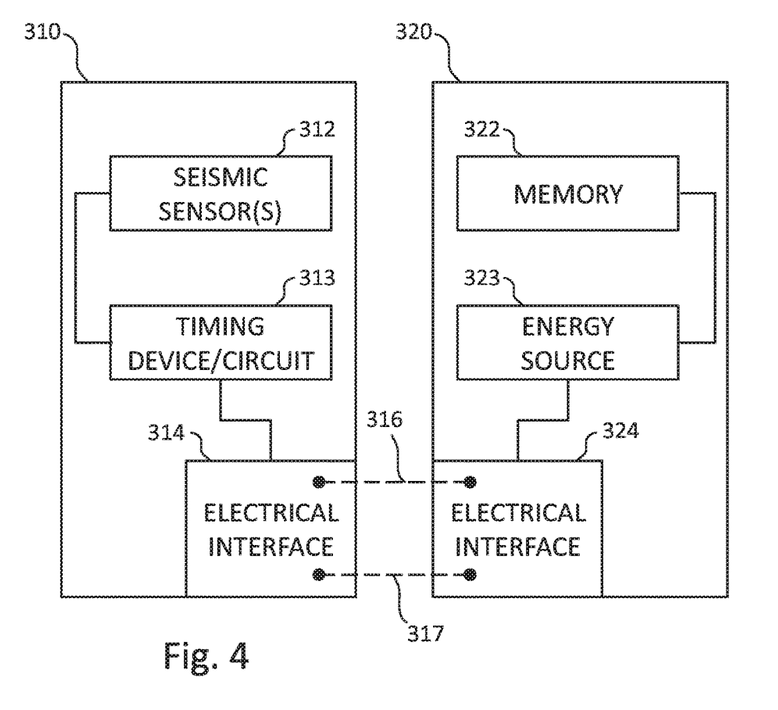
FIG. 4 is a block diagram illustrating exemplary components for a modular seismic sensor station or seismic node.

FIG. 4 is a block diagram illustrating exemplary components of representative seismic sensor station modules 310 and 320, according to an embodiment of the invention. As shown, the first (sensor) module 310 may include a housing with one or more seismic sensors 312, which may correspond to the sensors 110 of FIG. 1. The module 310 may also include a clock circuit or similar timing device 313 which may correspond to the timing device 130 of FIG. 1. The second (memory or clock) module 320 may include a power supply or other energy source 323 and memory 322, which may correspond to the energy source 140 and memory 120 respectively in FIG. 1. The modules 310 and 320 may include additional circuits and devices, as described herein, whether or not shown in the particular embodiment of FIG. 4.

In one embodiment, the modules 310 and 320 may each include an interface 314, 324 to exchange/transfer seismic data recorded by one or more seismic sensors and/or power between modules 310 and 320. For example, the electrical interfaces 314 and 324 of modules 310 and 320 respectively in FIG. 4 may be configured to transfer seismic data from the sensors 312 to the memory 322 via a data bus 316, and power from the energy source 323 to the sensors 312 (and timing device 313) via a power bus 317.

In one embodiment, physically coupling the housings of the components 310 and 320 may also establish an electrical connection between the interfaces 314 and 324. In one embodiment, the interfaces 314 and 324 may include connectors for coupling a data bus 316 for transferring seismic data recorded by the sensors 312 to the memory 322. The interfaces 314 and 324 may also include connectors for a power bus 317 configured to transfer power from the energy source or energy storage 323 to one or more components in the sensor package 310, e.g., the seismic sensors 312 and timing device 313. In an alternative embodiment, a common bus may be used to transfer power and data between the modules.

Embodiments of the invention are not limited to the specific arrangements of components in the modules 310 and 320 illustrated in FIG. 4. In alternative embodiments, any arrangement of components of a seismic sensor station in one module or in two or more connectable modules is contemplated, including, but not limited to, any such arrangements of seismic sensor, memory, timing, energy source and depth or pressure sensor components, as described herein.

Figure 5:
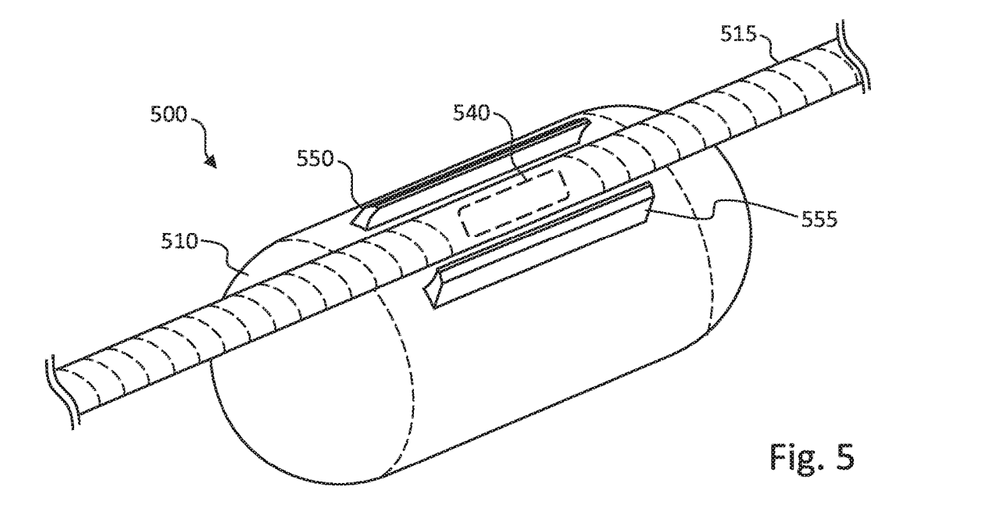
FIG. 5 is an isometric view of a modular seismic sensor station, in an embodiment configured for coupling to a rope.

FIG. 5 is an isometric view of a sensor station 500 in an embodiment configured for coupling to a rope or cable 515. FIG. 5 illustrates yet another embodiment of the invention wherein the seismic node or sensor station 500 is disposed adjacent rope 515, and equipped with clamping or coupling members 550 and 555 for coupling the housing or modular body 510 of seismic sensor station 500 to the rope 515. The seismic sensor station 500 may have a single integrated housing assembly or modular body 510 as shown in FIG. 2, or in alternative embodiments, the seismic sensor station 500 may be formed by coupling together a plurality of housings or modular body components 520, 530 to form housing assembly 510, as shown in FIG. 3.

In one embodiment of the invention, one or more components of the seismic sensor station 500 may be integrated in a deployment rope 515. For example, referring to FIG. 5, a seismic sensor station component 540 may be integrated into the rope or cable 515, within an outer radius or outer diameter of the rope or cable 515 as shown. Alternately, integrated component 540 may disposed along the rope or cable 515 but extend beyond the outer diameter. Integrated component 540 may also be disposed along the rope or cable 515 according to the embodiment of FIG. 2 or FIG. 3, inside the modular housing assembly.

In any of these embodiments, the integrated component 540 may include one or more seismic sensors, or any of the other seismic sensor station components described herein, including, but not limited to, a seismic sensors, timing and clock components, memory, energy sources and interfaces. Connecting the housing 510 of the seismic sensor station or node 500 to the rope 515 may further result in a physical, electrical, and/or inductive connection being established between the integrated sensor station component 540 and other sensor station components within the modular housing or body 510 of the sensor station 500, for example via an electronic interface configured for power and/or data bus connections.

While the housings shown in FIGS. 2-5, when fully integrated, are shown having a capsule shape or other elongated hydrodynamic body configuration, these examples are merely representative. In alternative embodiments, the housing 210 may have any shape including, but not limited to disk, rectangular, square, pyramid, etc., with or without symmetry such as bilateral symmetry or rotational symmetry about an axis.

Figure 6:
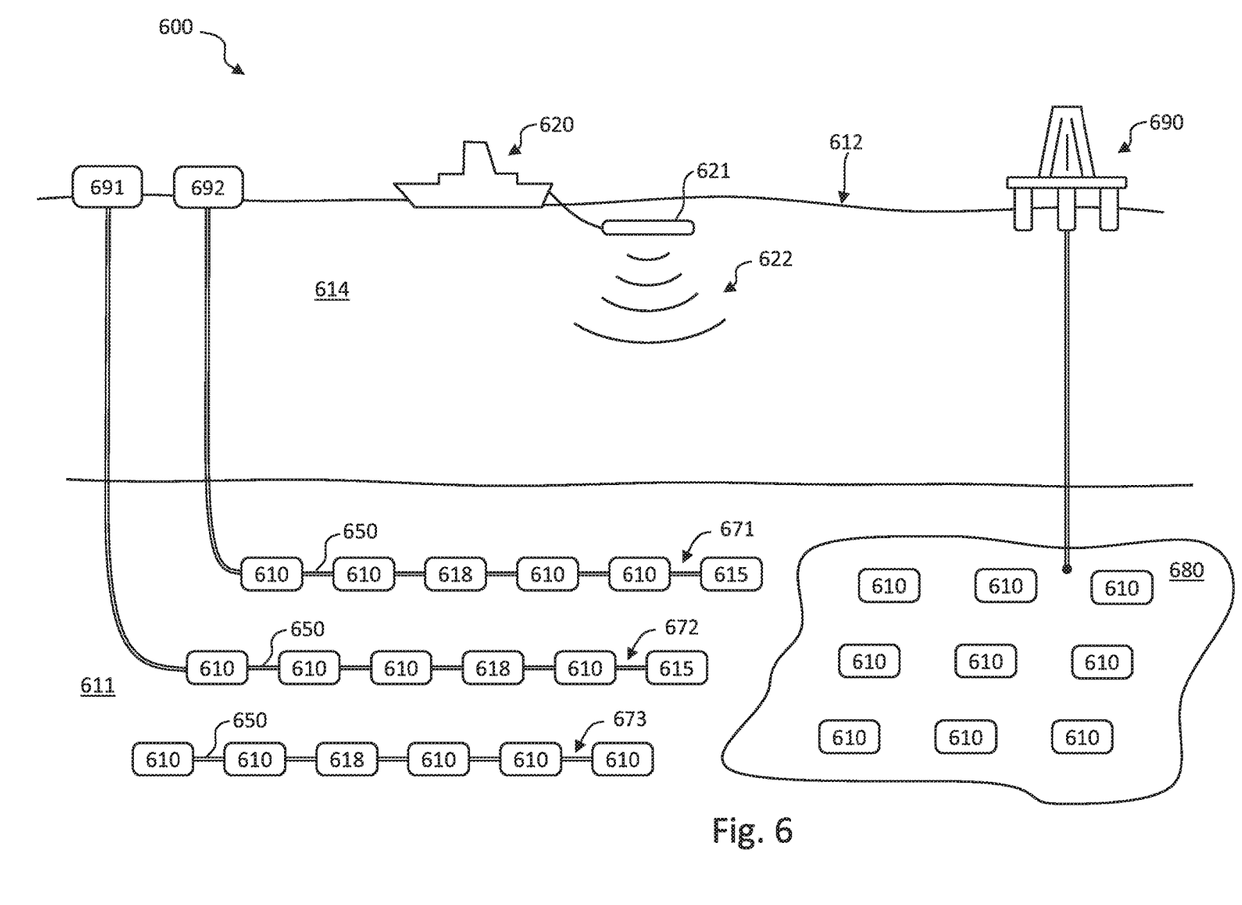
FIG. 6 is a schematic illustration of an exemplary seismic survey utilizing a plurality of modular seismic sensor stations or nodes.

FIG. 6 illustrates an exemplary seismic survey 600 according to an embodiment of the invention. As shown in FIG. 6, a plurality of autonomous sensor stations or nodes 610 may be deployed on a seabed 611 or below the surface 612 of a water body or water column 614. Suitable configurations for seismic nodes 610 include any of the seismic node and sensor station embodiments described herein.

As illustrated in FIG. 6, two or more of the sensor stations 610 may be deployed on the sea floor or bed via a respective rope or wire 650. In some embodiments, the rope 650 may be made from a synthetic material with a predefined specific density relative to the water in which it is immersed. In some embodiments, the rope 650 may be a passive rope, i.e., it may not include any electrical conductors. However, in alternative embodiments, the rope or cable 650 may include embedded conductors for communicating one or more of a clock signal, data signals, control signals and power among the individual seismic sensor stations or nodes 610. Thus, rope or cable 650 may have either a passive configuration, absent signal or power communications, or an active configuration, in which signal and/or power connections are provided.

While references may be made to a sea floor or seabed in this example, embodiments of the invention are not limited to any particular type of body of water or water column. Rather, embodiments of the invention may be used in any water, marine land-based or other environment including oceans, lakes, rivers, etc. Accordingly, the use of the term sea, seabed, sea floor, and the like herein should be broadly understood to encompass all bodies of water 614 and surfaces 611 suitable for propagation of seismic energy.

In particular embodiments, one or more seismic sensor stations 610 may be deployed to the sea floor or other surface 611 via any suitable technology, e.g., via a remotely or autonomously operated vehicle (ROV or AUV), by dropping nodes 610 from a deployment vessel or seismic vessel 620, etc. In yet another embodiment, each autonomous sensor station 610 may be equipped with a propulsion system and programmed to navigate through the water column 614 to and from predetermined locations on the sea floor 611. As can be seen in FIG. 6, deployment of the individual seismic sensor stations 610 without a rope 650 may be advantageous in areas near obstructions, e.g., in a working area 680 of sea floor 611 associated with an oil rig 690 or other operations, in order to avoid the rope 650 coming into contact with and potentially damaging or being damaged by obstructions and other underwater components during deployment and/or retrieval of nodes 610.

In one embodiment, rope-deployed seismic sensor stations may be coupled to a hub or buoy. For example, the rope segments 671 and 672 are shown coupled to respective hubs 691 and 692. While the hubs 691 and 692 are shown as provided on floating buoys, this is merely in representative and in alternative embodiments one or more of the hubs 691 and 692 may be placed on the sea floor 111. Hubs 691 and 692 may also float at a predefined depth above the sea floor 111 or below the surface 612, within the water column 614.

In one embodiment, the hubs 691 and 692 may include a high precision or "master" clock and communications components configured for data and/or power communications with the nodes 610. For example, a clock signal from the high precision clock may be transferred to sensor stations 610 via conductors in the ropes 650, to facilitate clock correction or to generate a clock signal at the sensor stations 610.

In some embodiments, the hubs 691 and 692 may also be configured to transfer power, data, and/or control signals to the sensor stations 610. Accordingly, the hubs 691 and 692 may be equipped with power generation and or energy storage devices, and/or control logic for performing quality checks and implementing predefined operating protocols, and the like. In some embodiments, signals sent from the hubs may be used, for example, to recharge sensor station batteries, to perform quality/station health tests, to turn the stations on/off, etc. In some embodiments, the hub devices may be equipped with a global positioning satellite (GPS) device or other positioning or navigational system, and/or a radio transmitter/receiver device in order to facilitate determining location of the hub and/or to facilitate communication with the hub device and/or nodes 610.

In embodiments where one or more of the ropes 650 are configured to transfer power and/or data signals, a tail termination device 615 may be provided at an end of each rope 650. A separate head termination device may also be provided in the hub device 691, 692, and the sea water may be used to couple the head and tail termination devices. In some embodiments, the hub devices 691, 692 may be omitted. For example the representative rope segment 673 is shown without an associated hub device, and without a tail termination device.

Referring again to FIG. 6, a source boat or vessel 620 can be configured to tow a seismic source 621 while conducting a seismic survey in the region of seismic nodes 610. In one embodiment, the seismic source 621 may be an air gun (or a number of air guns) configured to release a blast of compressed air into the water column 614, emitting acoustic energy towards the seabed 611. As shown in FIG. 6, the blast of compressed air generates seismic waves 622 which travel down through the water column 614 to the seabed 611, and which can penetrate the seabed 611 to reflect from sub-seabed surface structures. The reflections from the subsurface structures can be recorded by the sensor stations 610 as seismic data, and may thereafter be processed to develop an image of the subsurface layers and other structures. These images can be analyzed by geologists to identify areas likely to include hydrocarbons and other resources, or to identify additional geophysical features of interest.

In one embodiment of the invention, a plurality of source boats or seismic vessels 620 may be simultaneously operated while acquiring seismic data with nodes 610. In embodiments where multiple vessels 620 are used, the source boats may be configured to operate their respective seismic source or sources 621 according to a simultaneous source regime. For example, the sources 621 of two or more source boats 620 may be configured to emit seismic energy substantially simultaneously, or with a predefined delay such that there is at least some overlap in the duration of emission of seismic energy from two or more sources 621.

In one embodiment of the invention, a high precision clock may be included in each or selected seismic sensor stations 610. In alternative embodiments, a high precision clock signal may be provided via an external master clock configured to coordinate with slave timing devices that are implemented in the seismic sensor stations 610. The master clock may be located on a hub device 691, 682, or in devices 618 that may be placed at predefined intervals along an individual rope or cable 650. In one embodiment, the devices 618 may include only a high precision clock and an interface or other communications components. In alternative embodiments, the devices 618 may include other components such as power sources. In yet another embodiment, such devices 618 may be configured as a "superstation" or similar seismic node, e.g., a seismic sensor device with all the components of a seismic sensor station 610, as well as a high precision clock that can be used to provide a master clock signal to other nearby seismic sensor stations 610.

Pressure Wave and Shear Wave Signal Differentiation

Whether the autonomous sensor systems or nodes 610 are made from a single housing or multiple housings, in some embodiments the sensor system may include one or more seismic sensors or a combination of such sensors that are capable of producing a substantially shear free (or reduced shear) signal. Shear noise may be experienced by ocean bottom seismic systems or nodes 610 that are in contact with the ground or other subsurface 611, and therefore subject to undesirable vibration/noise propagating to nodes 610 through the ground.

For example, shear waves are typically generated at interfaces between subsurface layers, from which the pressure waves from a seismic source may reflect. Specifically, the reflection of a pressure wave at the interface may generate a reflected pressure wave as well as a shear wave, which may also be detectable by seismic sensors. The presence of shear waves can contaminate or provide a noise background to the desirable pressure signals that are recorded by the seismic sensors of the autonomous sensor systems or nodes 610. Embodiments of the invention provide sensors that are capable of rejecting at least a portion of such shear wave signals, thereby allowing preferential capture of the desirable pressure waves, or substantially only the pressure waves, either directly or by combining outputs of one or more of the sensor stations 610. Alternatively such sensors can be used to enhance or suppress shear wave effects in a combined sensor signal, as described herein.

Figure 7:
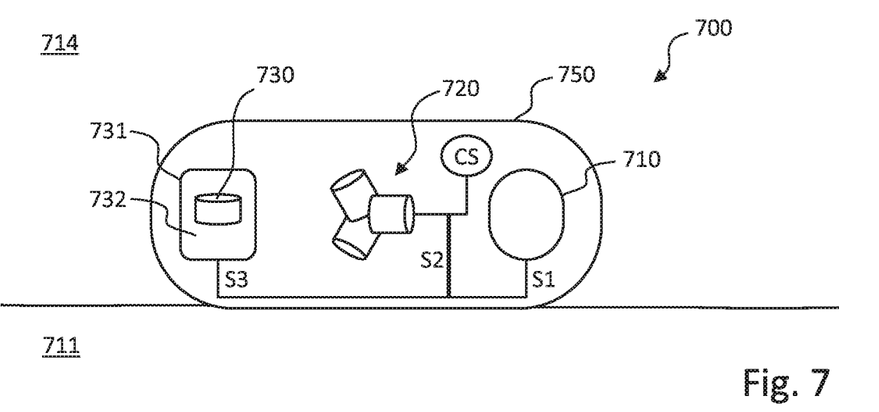
FIG. 7 is a schematic diagram of an exemplary modular, multiple-sensor seismic station or node.

FIG. 7 illustrates an autonomous sensor station or node 700 that may include a first sensor 710, a second sensor 720, and a third sensor 730, for example disposed on a seabed, ocean floor or other surface 711. Each of sensors 710, 720 and 730 is coupled in seismic contact with the surrounding water column or other seismic medium 714, in order to sample seismic energy propagating through the medium 714 in the form of seismic and acoustic waves. In one embodiment, for example, the first sensor 710 may be a hydrophone and the second sensor 720 may be a three component geophone, or a six-component geophone as described herein. The third sensor 730, in one embodiment, may be a "shear free" or reduced shear sensor capable of recording seismic signals with preferentially reduced shear contribution and/or distortions or noise originating from shear waves. The third sensor 730 may be a three component geophone, a single component (for example, vertical) geophone, or a two component geophone. In one particular example, the autonomous sensor system of FIG. 7 is shown having a single, vertical component, third sensor 730.

In some embodiments, the third sensor 730 may be enclosed in a region or sensor housing 731 that has an acoustic impedance similar to that of the surrounding water column 714, such that acoustic signals travelling through the water are transferred to the sensors therein with minimal reflection. In one embodiment, the exterior of the sensor housing 731 is formed from or comprises a perforated, rigid housing covered with a flexible, acoustically transparent skin, having an acoustic impedance matching that of the surrounding water column 714. The interior of the sensor housing 731 may be filled with a fluid or gel having a similarly selected acoustic impedance, or other impedance-matching acoustic medium 732.

For example, one or both of the sensor housing or skin 731 and the acoustic medium 732 may preferably have acoustic impedance substantially matching or substantially equal to that of the surrounding seawater, or otherwise selected to reduce acoustic reflection at the interfaces between water column 714, sensor housing or skin 731 and acoustic medium 732. The third sensor 730 may also be suspended in fluid, gel or other acoustic medium 732 such that the third sensor 730 is not substantially affected by motion of the external housing 750 of the autonomous sensor system 700, or subject to substantially less affects due to motion of the external housing 750, thereby shielding the third sensor 730 from shear noise that may be transferred via the housing 750.

In one embodiment of the invention, the outputs S1, S2, S3 of one or more of the first, second and third sensors 710, 720, 730 may be combined to generate a combined seismic signal CS. For example, in one embodiment, an output S1 of the first seismic sensor 710 (e.g., a hydrophone) and an output S3 of the third seismic sensor 730 (e.g., a shear free sensor) may be combined using a technique known as PZ Summation, or by otherwise summing or combining scaled values of the respective outputs, such that the combined signal CS substantially rejects ghosting and multiple effects.

The combined signal CS from the first and third sensors 710, 730 may either be separately recorded, or alternatively, further combined with an output S2 of the second seismic sensor 720. In one embodiment, an output S3 of a single, vertical component third sensor 730 by itself, or in combination with an output S1 of another sensor such as a hydrophone 710 may be combined and utilized to remove or lessen the impact of shear noise in an output S2 representing the vertical or horizontal components of motion detected by the second sensor 720 (e.g., a three-dimensional geophone).

In yet another embodiment, it may be deemed desirable to isolate the recorded shear energy to determine properties of the subsurface based on the recorded characteristic of the shear energy. In one such embodiment, shear energy may be isolated by combining an output S2 of the second sensor 720 and an output S3 of the third sensor 730. Specifically, because the second sensor 720 may record both shear waves and pressure waves, and the third sensor 730 may record substantially only pressure waves, or be preferentially sensitive to pressure waves as compared to shear waves, an output S3 of the third sensor 730 (sensitive to pressure waves) may be combined by subtracting from a suitably scaled value of an output S2 of the second sensor 720 (sensitive to both shear waves and pressure waves), in order to substantially isolate the shear energy and shear wave signal.

Figure 8:
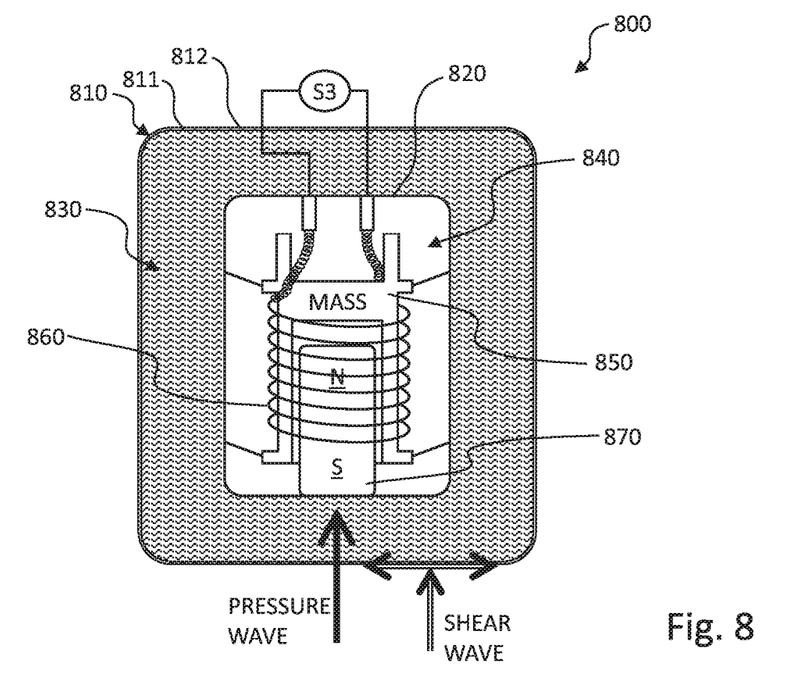
FIG. 8 is schematic diagram of an exemplary seismic sensor configuration for a modular seismic sensor station or seismic node.

FIG. 8 illustrates a more detailed example of a shear-free or reduced-shear sensor 730 or seismic sensor apparatus 800, according to various embodiments of the invention. As shown, the sensor apparatus 800 may include a first external sensor housing 810 and a second internal sensor housing 820. The internal sensor housing 820 is suspended in a shear absorbing liquid, gel, fluid or similar impedance-matching acoustic medium 830, within the external housing 810, and the sensor apparatus 840 is disposed within the internal housing 820. The specific gravity of the internal housing 820 and the shear absorbing fluid or other acoustic medium 830 may be substantially similar, in one embodiment, to facilitate suspension of the internal housing 820 and internal sensor 840 in the acoustic medium 830.

As described herein, the external housing 810 may be designed such that shear energy from a shear wave (e.g., S-Wave or PS-Wave) is dispersed at the external sensor housing 810, whereas pressure waves (e.g., P-Waves) are transmitted through the housing with minimal attenuation. For example, the external housing 810 may be formed of or comprise a perforated, rigid housing member 811 covered with a flexible, acoustically transparent skin or acoustic layer 812, in one embodiment. The pressure waves may travel through both the external housing 810 and the shear absorbing fluid or similar medium 830, for example, sea water or a gel with selected acoustic impedance and other acoustic properties, and may be recorded by a geophone 840 or other example of the third sensor 730 in FIG. 7, e.g., disposed within a second internal housing 820 as shown in FIG. 8.

Suitable acoustic media 830 may preferentially transmit pressure wave energy in the form of acoustic waves incident from the surrounding water column (or other seismic medium), while preferentially dissipating, suppressing or otherwise reducing the transmission of shear wave energy. Suitable sensor housings 810 can also be configured to preferentially transmit pressure wave energy in the form of acoustic waves, while preferentially dissipating shear wave energy. For example a perforated shell or casing 811 can be configured to absorb the shear wave energy and transmit pressure wave energy, and an acoustic layer or skin 812 can be configured to transmit the pressure wave energy in the form of acoustic waves propagating through the acoustic medium 830.

Depending on application, the acoustic layer 812 may be non-permeable to the acoustic medium 830, in order to retain the acoustic medium 830 within the outer sensor housing 810. Alternatively, the acoustic layer 812 may be semi-permeable or permeable to the acoustic medium 830, in order to allow exchange of the acoustic medium with the outer water column. In some examples, the acoustic medium 830 may be seawater or other fluid exchanged or commingled with the surrounding water column or other seismic medium.

As shown in FIG. 8, a representative "shear free" or reduce-shear seismic sensor 800 comprises a geophone, accelerometer or similar motion sensor apparatus 840 disposed within an inner sensor housing 820, for example with a test mass 850 and inductive coil 860 in biased suspension with respect to a magnet or other field source 870. In this single-axis sensor example, test mass 850 and pickup coil

860 are configured to execute motion along the vertical axis, driven by seismic energy incident on inner housing 820. The relative motion of coil 860 with respect to the field source 870 generates an inductive signal, which is characterized by seismic sensor signal or output S3. The output S3 is preferentially sensitive to the pressure wave energy propagating through the surrounding acoustic medium 830, while shear wave energy is preferentially dissipated or suppressed, as described above.

In other embodiments, inductive, piezoelectric and micromechanical system (MEMS) sensor components can be used, in either single-axis or multiple-axis configurations. Referring to the subject matter of FIG. 7, in such embodiments any one or more of the first sensor 710, second sensor 720, and third sensor 730 may be implemented as a six-component seismic sensor configured for measuring three degrees of freedom in linear motion along three independent directions and three degrees of freedom in rotation about three independent axes. In some of these embodiments, the sensor is provided with three accelerometers or similar piezoelectric sensors coupled to a single test mass, and arranged along independent or orthogonal axes. An advantage of such a six-component sensor system is that one single mass enables the sensor to measure independently compressional energy, as well as shear energy in all three independent (orthogonal) directions.

The resonance of such a multi-axis, single mass accelerometer can be one or more orders of magnitude higher than other sensors (e.g., a typical particle acceleration sensor), which enables a reasonable implementation of a high-cut mechanical shock system while maintaining flat response within a seismic band. The accelerometer may incorporate directional sensing by configuring the crystals and beams in unique orientations by attaching to the crystals with supports that are "stiff" along the principal axis of sensing and "soft" in cross axes. The objective is to minimize distortion in the frame while maximizing shear stress in the crystal along the sensing direction.

Such a sensor provides both linear and rotational measurements. The rotational measurements can provide substantially pure shear data, and having both rotational and translational data allows for the computation of derivatives of the wave field. Such calculations can provide for removal of shear contamination from ocean-bottom node (OBN) data, as well as improved interpolation of primary or pressure wave (P-wave) and secondary of shear-wave (S-wave or PS-wave) data, thereby making deep-water node C-wave (PS-wave or converted wave) surveys viable.

EXAMPLES

An ocean bottom seismic data acquisition system may utilize a multi-axis or single mass accelerometer, as described herein. Such a system can include a sensor station with one or more seismic sensors, e.g. where the seismic sensors include any number and combination of hydrophones, geophones, accelerometers, or the like. At least one of the seismic sensors may be suspended in an acoustic medium selected to preferentially transmit acoustic waves, e.g. where shear waves are preferentially suppressed or dissipated. Signals from each of the sensors can then be individually recorded or combined to suppress or enhance shear contributions, as described herein.

Representative seismic sensor systems according to any of the examples and embodiments herein may include a sensor housing in communication with a seismic medium and an acoustic medium disposed within the sensor housing, e.g. where the acoustic medium is selected based on an acoustic impedance of the seismic medium. A seismic sensor can be suspended within the acoustic medium, e.g. where the sensor housing is configured to dissipate shear wave energy incident from the seismic medium and the acoustic medium is selected to transmit pressure wave energy from the seismic medium to the seismic sensor.

The seismic sensor may comprise an accelerometer or geophone disposed within an inner housing that is suspended in the acoustic medium. The acoustic medium may comprise a fluid or gel selected to match the acoustic impedance of the seismic medium.

The sensor housing may comprise a perforated member configured to dissipate the shear wave energy incident from the seismic medium and to transmit the pressure wave energy to the acoustic medium. An acoustic layer or skin can be disposed adjacent the perforated member, e.g. where the acoustic layer or skin is selected to match the acoustical impedance of the seismic medium. The seismic medium may comprise a water column, and the acoustic medium can comprise seawater or other fluid of the water column.

The seismic sensor may comprise at least a vertical geophone. The system may further comprise a hydrophone disposed proximate the vertical geophone in a housing assembly, e.g. where signals from the vertical geophone and the hydrophone are combined to reduce ghosting in the combined signal.

The seismic sensor may further comprise a three-dimensional geophone disposed proximate the seismic sensor within a housing assembly, e.g. where signals from the seismic sensor and the three-dimensional geophone are combined to enhance or suppress shear wave energy effects in the combined signal. The three-dimensional geophone may comprise a single-mass accelerometer with sensitivity to linear motion in three independent directions, and to rotational motion about three independent axes.

Sensor systems according to any of the examples and embodiments herein may include a housing assembly configured for deployment of the sensor system in a seismic medium. At least one hydrophone or geophone may be disposed within the housing assembly, and configured to generate seismic data responsive to seismic energy transmitted from the seismic medium. A seismic sensor can be suspended within an acoustic medium inside the housing assembly, e.g. where the acoustic medium is selected to transmit acoustic signals from the seismic medium to the seismic sensor and shear wave energy incident from the seismic medium is dissipated The seismic sensor may comprise an accelerometer. The accelerometer can be configured for measuring at least a vertical component of motion in response to the acoustic energy transmitted through the acoustic medium.

A sensor housing can be disposed about the seismic sensor and the acoustic medium, e.g. with the sensor housing comprising a perforated member configured to transmit the acoustic signals and dissipate the shear wave energy. A specific gravity of the acoustic medium can be selected to suspend the seismic sensor inside the sensor housing. The sensor housing may be permeable to the acoustic medium, and configured for exchange of the seismic medium and the acoustic medium. An acoustic layer can be disposed adjacent the perforated member, the acoustic layer adapted to transmit the acoustic signals from the seismic medium and to retain the acoustic medium within the sensor housing.

A sensor system according to any of the examples and embodiments herein may include a timing circuit configured to generate a clock signal associated with the seismic data, memory configured to store the seismic data and associated clock signal, and a depth sensor configured to determine a depth of the seismic sensor system. One or more of the hydrophone or geophone, the seismic sensor, the memory and the timing circuit can be configured for powering on or off, based on the depth.

A clamp or coupling mechanism can be configured for attachment of the housing assembly to a rope or cable, e.g., for deployment in a water column. At least one component of the seismic sensor system can be disposed within the rope or cable, e.g., with the component selected from a geophone, a hydrophone, a depth sensor, a timing or clock circuit, and memory. The housing assembly can define a hydrodynamic body having an axial opening adapted to accommodate the rope or cable. The housing assembly can comprise at least first and second modular components configured for attachment of the sensor system about the rope or cable, each of the first and second modular housing components having an interface configured for data communication therebetween.

Methods of acquiring seismic data according to any of the examples and embodiments herein may include acquiring seismic data from a hydrophone and a geophone disposed proximate one another within a housing assembly. The methods may include acquiring data from a seismic sensor suspended in an acoustic medium within the housing assembly, e.g., with the acoustic medium selected to transmit acoustic energy incident from the seismic medium, where shear wave energy incident from the seismic medium is dissipated. Data from the seismic sensor may be combined with data from one or both of the hydrophone and geophone, e.g. where shear wave effects are enhanced or suppressed in the combined data.

Suitable methods may include combining the data from the seismic sensor with the data from the hydrophone to generate the combined data with suppressed ghosting effects. The data from the seismic sensor can also be combined with the data from the geophone to generate the combined data, e.g. with enhanced or substantially isolated shear wave effects.

Suitable methods may further comprise characterizing linear motion in three independent directions and rotation about three independent axes, based on the seismic data acquired from the geophone. The linear motion may be responsive to the acoustic energy incident from the seismic medium, and the rotation may be responsive to the shear wave energy incident from the seismic medium. A derivative of a wavefield propagating through the seismic medium can be calculated based at least in part on the rotation. Pressure wave data and shear wave data can be interpolated, the interpolated data characterizing such a seismic wavefield propagating through the seismic medium based at least in part on the rotation.

In additional examples, the sensor station may include one or more of a scalar pressure sensor and a three component (3C) sensor configured to measure three spatial components of seismic waves, e.g., one or more micro electro mechanical system (MEMS) accelerometers or piezo-electric sensors. One or more additional components can also be included in the sensor station, for example a timing device or circuit configured to generate a clock signal, memory configured to store seismic data from the sensors, an energy source configured to provide power to the sensors, and other electronic components.

The system may include one or more depth or pressure sensors configured to determine a depth of the seismic sensor station during deployment and/or retrieval. During deployment, one or more sensors, memory and other circuits or electronic components of the seismic sensor station may not be powered until a threshold depth is reached, e.g., as measured by the depth or pressure sensors. When the threshold depth is reached, one or more of the circuits or electronic components of the seismic sensor station can also be powered down.

By selectively powering one or more such circuits or electronic components of the seismic sensor station during deployment and/or retrieval, the sensor station can conserve power and extend operational lifetime. In particular, the operation lifetime of the seismic sensors and/or station can be extended during operations to record seismic data, as compared to such a system without the capability for selectively powering on and off one or more circuits or electronic components, whether based on depth, timing, or another operational parameter.

In some examples the seismic sensor station is formed with a single integrated housing, and all circuits or electronic components of the sensor station are contained within the housing. The seismic sensor station can also be configured to be deployed via a rope, for example with the housing having a passage defined therethrough and configured for receiving the rope, or a connection mechanism configured to facilitate connection to the rope.

A seismic survey apparatus can include two or more such sensor stations, as described herein. A method for deploying the sensor stations in a seismic survey apparatus can be implemented by disposing the stations along a rope or wire, or via a remotely or autonomously operated vehicle, or using autonomous propulsion systems provided on each of the sensor stations. Additional methods are encompassed for towing such a seismic survey apparatus behind a vessel.

Methods for seismic data acquisition include operating such a seismic data acquisition system, as described herein. A non-transitory computer-readable data storage medium can also be provided with program code embedded thereon, where the program code is executable on a computer processor to execute such a method for seismic data acquisition by operating a seismic data acquisition system as described herein.

An autonomous sensor system can be configured according to any of the above examples, with the system having one or more of a first sensor, a second sensor, and/or a third sensor comprising one or more of a hydrophone, a three component geophone and a shear free sensor capable of recording seismic signals absent substantial distortion from shear waves. For example, such an autonomous sensor system may include one or more of the sensors enclosed in a region or housing with an acoustic impedance similar to that of surrounding water, so that acoustic signals travelling through the water are transferred to the sensors therein with minimal reflection.

The exterior of the housing can include or be formed as a perforated, rigid housing covered with a flexible, acoustically transparent skin. The interior of the housing can be filled with a fluid, where the skin and fluid both have acoustic impedances substantially equal to that of surrounding water or seawater. At least one of the sensors can be suspended in the fluid, so that the suspended sensor is partially or substantially isolated from motion of the housing of the autonomous sensor system, thereby shielding the sensor from shear noise transferred via the housing.

An autonomous sensor system can be provided according to any of the above examples, where the outputs of one or more of the sensors are combined to generate a combined seismic signal. Such a combined signal may substantially reject ghosting and multiple effects, and the combined signal can either be separately recorded or further combined with output of one or more others of the sensors. The output of a single, vertical component sensor can be utilized to remove or reduce or lessen impact of shear noise in the vertical or horizontal components of another of the sensors, either by itself or in combination with the output of one or more additional sensors such as a hydrophone.

Recorded shear energy can be isolated to determine properties of subsurface structure based on the shear energy. The shear energy may preferably be isolated by combining outputs of the sensors, and further preferably by one of the sensors recording both shear waves and pressure waves and another of the sensors recording only pressure waves, still further preferably with one or more such outputs being subtracted to isolate the shear energy.

An autonomous shear-free sensor system can be configured for any of the above examples, the sensor including an external or outer housing and an internal housing suspended in a shear absorbing fluid or medium within the external housing, the specific gravity of the internal housing and the shear absorbing medium preferably selected to be substantially similar to facilitate suspending the inner housing in the fluid or gel within the outer housing. The external housing can be designed such that shear energy is dispersed or dissipated at the housing, whereas pressure waves are transmitted through the housing with substantially minimal attenuation. The external housing can also comprise a perforated, rigid housing component covered with a flexible, acoustically transparent skin, the pressure waves can travel through both the external housing and the shear absorbing medium, the medium can comprise sea water or gel, and/or the waves can be recorded by a geophone formed within the inner housing.

A sensor system can be configured for any of the above examples, with any one or more of the sensors implemented in the form of a single mass accelerometer as described herein. Similarly, any one or more of the sensors may be configured as a six component sensor, as described herein. Moreover, any one or more of the sensors can be configured as a single mass sensor for independently measuring compressional energy as well as shear energy, e.g., in one, two or three different orthogonal directions.

Unless specifically indicated, all references to geophones utilized in the invention include conventional geophones as well as other known devices for detecting seismic wave activity or directional sensors, including without limitation, accelerometers, and references to accelerometers likewise include other directional sensors, including, without limitation, geophones. While the foregoing is directed to embodiments of the present invention, other and further embodiments of the invention may be devised without departing from the basic scope thereof, and the scope thereof is determined by the claims that follow.

While this invention is described with respect to particular exemplary embodiments, it is understood that changes can be made and equivalents may be substituted to adapt the disclosure to different problems and application, while remaining within the spirit and scope of the invention as claimed. The invention is not limited to the examples that are described, but encompasses all embodiments falling within the scope of the appended claims.

The invention claimed is:

1. An ocean bottom seismic sensor system comprising:
   an external housing configured for deployment within a seismic medium on a sea floor;
   a sensor housing disposed within the external housing and configured for communication with the seismic medium;
   an acoustic medium disposed within the sensor housing, the acoustic medium selected based on an acoustic impedance of the seismic medium; and
   a seismic sensor suspended within the acoustic medium and substantially isolated from motion of the sensor housing, wherein
   the sensor housing is configured to dissipate shear wave energy incident from the sea floor; and
   the acoustic medium transmits pressure wave energy from the seismic medium to the seismic sensor.

2. The ocean bottom seismic sensor system of claim 1, wherein one or more of:
   the seismic sensor comprises an accelerometer or geophone disposed within the sensor housing suspended in the acoustic medium; and
   the acoustic medium comprises a fluid or gel that matches the acoustic impedance of the seismic medium.

3. The ocean bottom seismic sensor system of claim 1, wherein the sensor housing comprises a perforated member configured to dissipate the shear wave energy incident from the sea floor and to transmit the pressure wave energy to the acoustic medium.

4. The ocean bottom seismic sensor system of claim 3, wherein one or both of:
   an acoustic layer or skin is disposed adjacent to the perforated member and the acoustic layer or skin matches the acoustical impedance of the seismic medium; and
   the seismic medium comprises a water column and the acoustic medium comprises seawater or other fluid of the water column.

5. The ocean bottom seismic sensor system of claim 1, wherein
   the seismic sensor comprises at least a vertical geophone;
   the ocean bottom seismic sensor system further comprises a hydrophone disposed proximate to the vertical geophone within the external housing; and
   signals from the vertical geophone and the hydrophone are combined to reduce ghosting in a combined signal.

6. The ocean bottom seismic sensor system of claim 1 further comprising a three-dimensional geophone disposed proximate to the seismic sensor within the external housing, wherein signals from the seismic sensor and the three-dimensional geophone are combined to enhance or suppress shear wave energy effects in a combined signal.

7. The ocean bottom seismic sensor system of claim 6, wherein the three-dimensional geophone comprises a single-mass accelerometer with sensitivity to linear motion in three independent directions and to rotational motion about three independent axes.

8. The ocean bottom seismic sensor system of claim 1, wherein there is no mechanical coupling between the seismic sensor and the sensor housing.

9. An ocean bottom sensor system comprising:
   a housing assembly configured for deployment of the sensor system in a seismic medium on a sea floor;
   at least one hydrophone or geophone disposed within the housing assembly and configured to generate seismic data responsive to seismic energy transmitted from the sea floor and through the seismic medium; and
   a seismic sensor suspended within an acoustic medium inside the housing assembly and substantially isolated from motion of the housing assembly, wherein the acoustic medium transmits acoustic signals from the seismic medium to the seismic sensor, and shear wave energy incident from the ocean bottom surface is dissipated.

10. The ocean bottom sensor system of claim 9, wherein the seismic sensor comprises an accelerometer configured for measuring at least a vertical component of motion in response to the acoustic energy transmitted through the acoustic medium.

11. The ocean bottom sensor system of claim 9 further comprising a sensor housing disposed about the seismic sensor and the acoustic medium, the sensor housing comprising a perforated member configured to transmit the acoustic signals and to dissipate the shear wave energy.

12. The ocean bottom sensor system of claim 11, wherein one or more of:

a specific gravity of the acoustic medium suspends the seismic sensor inside the sensor housing; and the sensor housing is permeable to the acoustic medium and is configured for exchange of the seismic medium and the acoustic medium.

13. The ocean bottom sensor system of claim 11 further comprising an acoustic layer adjacent to the perforated member, wherein the acoustic layer is adapted to transmit the acoustic signals from the seismic medium and to retain the acoustic medium within the sensor housing.

14. The ocean bottom sensor system of claim 9 further comprising:

a timing circuit configured to generate a clock signal associated with the seismic data;

memory configured to store the seismic data and associated clock signal; and a depth sensor configured to determine a depth of the sensor system;

wherein one or more of the hydrophone or geophone, the seismic sensor, the memory, and the timing circuit are configured for powering on or off based on the depth.

15. The ocean bottom sensor system of claim 9 further comprising a clamp or coupling mechanism configured for attachment of the housing assembly to a rope or cable for deployment in a water column.

16. The ocean bottom sensor system of claim 15 further comprising at least one component of the sensor system disposed within the rope or cable, the component selected from a geophone, a hydrophone, a depth sensor, a timing or clock circuit, and memory.

17. The ocean bottom sensor system of claim 15, wherein one or more of:

the housing assembly defines a hydrodynamic body having an axial opening adapted to accommodate the rope or cable; and the housing assembly comprises at least first and second modular components configured for attachment of the sensor system about the rope or cable, each of the first and second modular components having an interface configured for data communication therebetween.

18. The ocean bottom sensor system of claim 9, wherein there is no mechanical coupling between the seismic sensor and the housing assembly.

19. A method comprising:

acquiring seismic data from a hydrophone and a geophone disposed proximate to one another within a housing assembly situated on a sea floor;

dissipating shear wave energy incident on the housing assembly from the sea floor to shield a seismic sensor suspended in an acoustic medium within the housing assembly from the shear wave energy;

acquiring data from the seismic sensor suspended in the acoustic medium within the housing assembly, wherein the acoustic medium transmits acoustic energy incident from the seismic medium; and combining data from the seismic sensor with data from one or both of the hydrophone and the geophone, wherein shear wave effects from the shear wave energy are enhanced or suppressed in the combined data.

20. The method of claim 19 further comprising one or more of:

combining the data from the seismic sensor with the data from the hydrophone to generate the combined data with suppressed ghosting effects; and combining the data from the seismic sensor with the data from the geophone to generate the combined data with enhanced or substantially isolated shear wave effects.

21. The method of claim 19 further comprising characterizing linear motion in three independent directions and rotation about three independent axes based on the seismic data acquired from the geophone, wherein the linear motion is responsive to the acoustic energy incident from the seismic medium and the rotation is responsive to the shear wave energy incident from the sea floor.

22. The method of claim 21, further comprising one or more of:

calculating a derivative of a wavefield propagating through the sea floor based at least in part on the rotation; and interpolating pressure wave data and shear wave data characterizing a seismic wavefield propagating through the seismic medium and the sea floor based at least in part on the rotation.

23. A method for conducting a seismic survey, the method comprising:

deploying an ocean bottom seismic data acquisition system to a sea floor;

operating a source vessel configured to generate seismic signals;

recording reflected seismic signals from portions of the earth below the sea floor using at least one seismic sensor within the ocean bottom seismic data acquisition system positioned on the sea floor, wherein the at least one seismic sensor measures pressure wave energy substantially isolated from shear wave energy; and generating a measurement from the recorded seismic signals that is free from or substantially free from shear contamination.

24. The method of claim 23 further comprising towing by the source vessel a seismic source configured to generate the seismic signals in a water column disposed above the sea floor.

25. The method of claim 23, wherein the ocean bottom seismic data acquisition system comprises one or more of:

an ocean bottom cable; and an autonomous ocean bottom node.

26. The method of claim 23, wherein the at least one seismic sensor is configured to be responsive to and record displacement of the at least one seismic sensor in at least one direction.

27. The method of claim 26, wherein the at least one seismic sensor is suspended in an acoustic medium that transmits acoustic energy and dissipates shear wave energy such that the recorded seismic signal is free from or substantially free from shear contamination.

28. The method of claim 23, wherein the ocean bottom seismic data acquisition system comprises a plurality of seismic sensors; and the method further comprises combining outputs from two of more of the plurality of seismic sensors to generate the measurement that is free from or substantially free from shear contamination.

* * * * *

UNITED STATES PATENT AND TRADEMARK OFFICE
CERTIFICATE OF CORRECTION

PATENT NO. : 10,274,627 B2
APPLICATION NO. : 15/339233
DATED : April 30, 2019
INVENTOR(S) : Peter Graham Stewart and Cornelis A. M. Faber It is certified that error appears in the above-identified patent and that said Letters Patent is hereby corrected as shown below:

In the Specification

In Column 1, Line 10:
"Ser. No. 15/399,276"

Should be:
--Ser. No. 15/339,276--

Signed and Sealed this
Sixth Day of August, 2019

Andrei Iancu
*Director of the United States Patent and Trademark Office*